United States Patent [19]
Noguchi

[11] Patent Number: 6,038,376
[45] Date of Patent: *Mar. 14, 2000

[54] DISPLAY APPARATUS AND CONTROL METHOD THEREFOR

[75] Inventor: Yasutaka Noguchi, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/626,317

[22] Filed: Apr. 2, 1996

[30] Foreign Application Priority Data

Apr. 3, 1995 [JP] Japan .................................. 7-077610

[51] Int. Cl.$^7$ ................................................. G06F 15/00
[52] U.S. Cl. ........................................... 395/114; 395/112
[58] Field of Search ..................... 395/114, 112, 395/101, 113, 117; 358/407, 468, 434, 435, 436, 437, 438, 439; 400/61, 76, 83, 703; 347/142; 710/8

[56] References Cited

U.S. PATENT DOCUMENTS 5,431,505  7/1995  Kato et al. ............................... 400/703

FOREIGN PATENT DOCUMENTS 0575168  12/1993  European Pat. Off. .

*Primary Examiner*—Dov Popovici
*Attorney, Agent, or Firm*—Fitzpatrick, Cella, Harper & Scinto

[57] ABSTRACT

A print control apparatus for controlling a printing operation on the basis of an instruction sent from an information processing apparatus including first input unit for inputting an instruction by a user, operational-environment setting unit for setting an operational environment in one of first and second modes, wherein setting of the environment based on the instruction from the information processing apparatus and the first input unit is permitted in the first mode, and wherein setting of the environment based on the instruction from the information processing apparatus is permitted and setting of the environment based on the instruction from the first input unit is prohibited in the second mode. A control unit is for terminating the setting of the operational environment based on the instruction from the first input unit in a case where it is instructed to switch the first mode to the second mode while the setting of the operational environment is performed based on the instruction from the first input unit in the first mode.

40 Claims, 14 Drawing Sheets

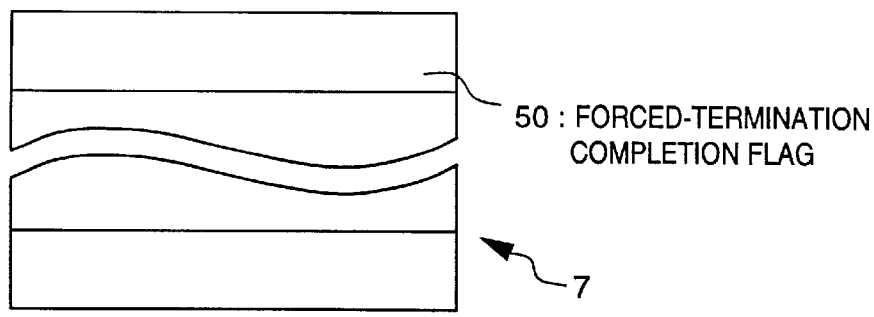
FIG. 2
FIG. 3
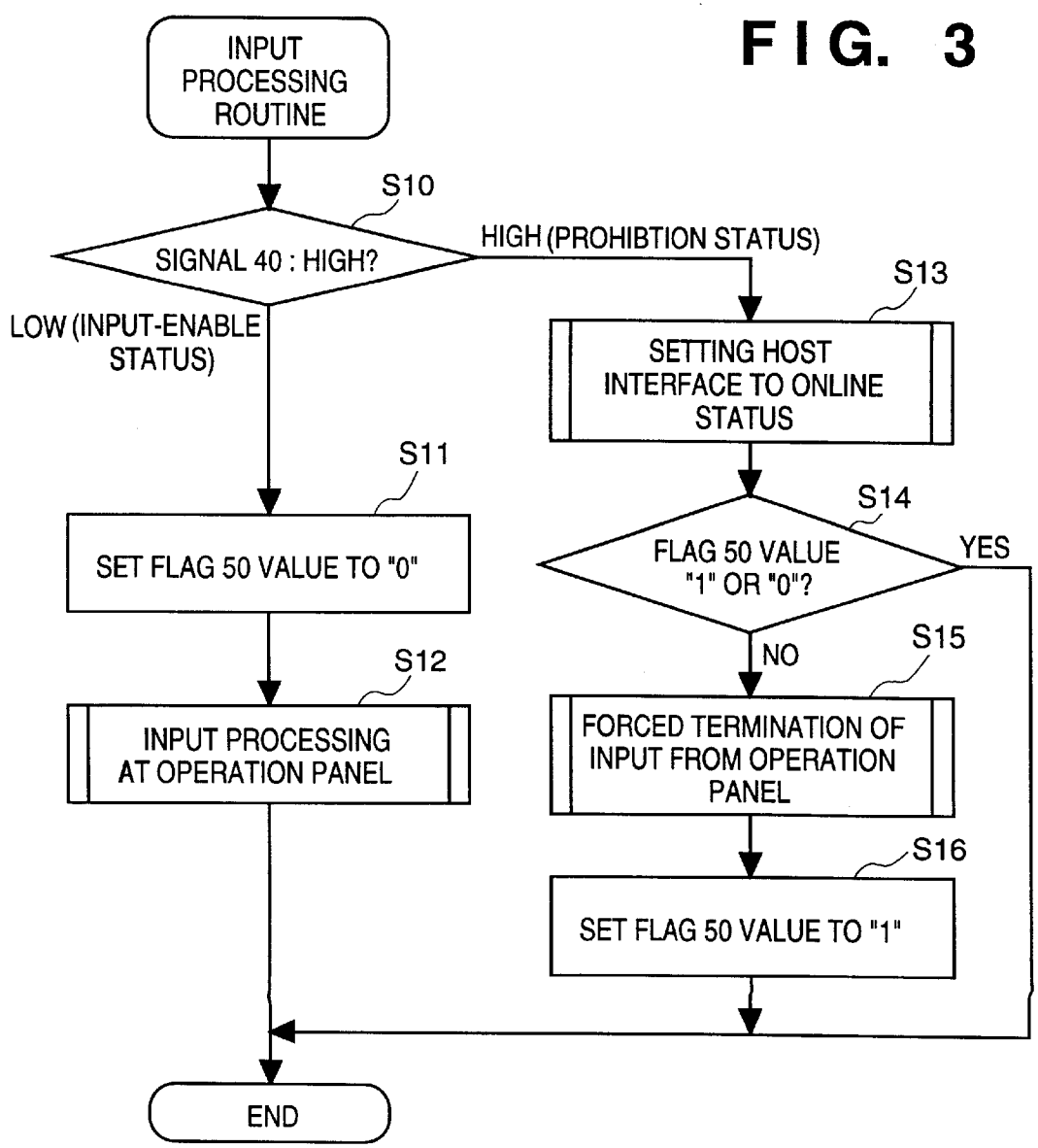

FIG. 13

| PRINTING ENVIRONMENT | OUTLINE OF PRINTING ENVIRONMENT |
|---|---|
| PAPER-FEED SELECTION | TO SET PAPER FEEDER |
| PAPER SIZE IN PAPER TRAY | TO SET SIZE OF PAPER IN PAPER TRAY |
| DOUBLE-SIDED PRINTING | TO SET DOUBLE / SINGLE-SIDED PRINTING WHEN OPTIONAL DOUBLE-SIDED PRINTING UNIT IS ATTACHED |
| BINDING MARGIN | TO SET ADDING / NOT ADDING BINDING MARGIN TO PAPER END |
| DATA-PROCESSING RESOLUTION | TO SET QUICK MODE (300 DPI) OR FINE MODE (600DPI) AS DATA PROCESSING RESOLUTION |
| TONER DENSITY | TO ADJUST PRINTING (TONER) DENSITY |
| NUMBER OF COPIES | TO SET THE NUMBER OF COPIES |

FIG. 14A

| PAPER-FEED MODE = AUTOMATIC |

FIG. 14B

| PAPER-FEED MODE = TRAY |

FIG. 14C

| 00 READY A4 |

FIG. 14D

| TRAY PAPER SIZE = A4 |

FIG. 14E

| TRAY PAPER SIZE = FREE |

FIG. 14F

| 00 READY FR |

FIG. 14G

| SETUP EXPANDED FUNCTION |

FIG. 14H

| SETUP LAYOUT |

FIG. 14I

| LAYOUT VERTICAL CORRECTION |

FIG. 14J

| LAYOUT BINDING DIRECTION |

FIG. 14K

| BINDING DIRECTION = LENGTHWISE |

FIG. 14L

| BINDING DIRECTION = WIDTHWISE |

FIG. 14M

| LAYOUT BINDING MARGIN |

FIG. 14N

| BINDING MARGIN = 0.0 |

FIG. 14O

| SETUP PRINTING ADJUSTMENT |

FIG. 14P

| PRINTING ADJUSTMENT = RESOLUTION |

FIG. 14Q

| RESOLUTION = QUICK |

FIG. 14R

| EXPANDED FUNCTION NUMBER OF COPIES |

FIG. 14S

| EXPANDED FUNCTION TONER DENSITY |

FIG. 14T

| TONER DENSITY = 4 |

FIG. 14U

REMOTE PANEL

FILE (F) TRANSMISSION (T) TEST (C) OPTION (O) HELP (H)

PAPER FEED | SETUP

NUMBER OF (P) (1 ~ 255) : [1]
COPIES

DATA-PROCESSING :   ⦿ FINE (G)
RESOLUTION          ○ QUICK (Q)

TONER DENSITY (N) (1 ~ 8) : [4]

PRINTING :   ○ SINGLE-SIDED (S)
             ⦿ DOUBLE-SIDED (D)

BINDING MARGIN (B)   [0.0] mm
(-30.0 ~ 30.0) :

BINDING :    ⦿ LENGTHWISE (L)
DIRECTION    ○ WIDTHWISE (W)

EXPANDED         OPERATION
FUNCTION (E) ... MODE (M) ...

TRANSMISSION (A)   HELP (V)

ONLINE | BIDIRECTIONAL

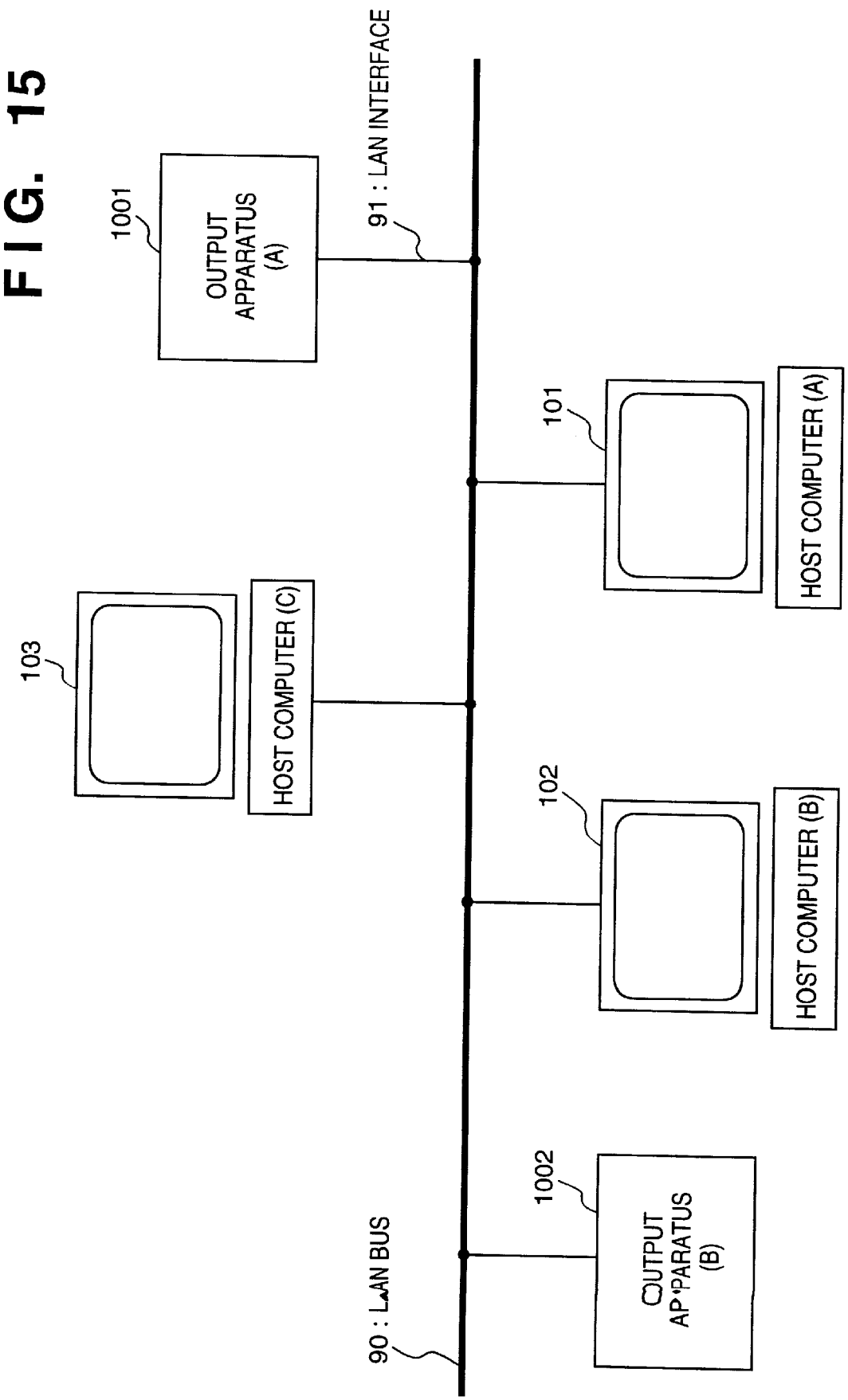

DISPLAY APPARATUS AND CONTROL METHOD THEREFOR

BACKGROUND OF THE INVENTION

This invention relates to an output apparatus and control method therefor and, more particularly to an output apparatus connectable to an information processing apparatus via a communication medium and control method therefor.

In a conventional output apparatus of this type, connected to a host computer, the operational environment of the output apparatus is set on the output apparatus side, regardless of the operation of a host computer connected to the apparatus or the operation of the output apparatus interlocked with the host computer.

The problem is that while the host computer manages the operation of the output apparatus, setting of the operational environment of the output apparatus, set by the host computer, might be changed by manipulating an operation panel on the output apparatus. In addition, while the host computer manages the operation of the output apparatus, the output apparatus might be set to offline status from the operation panel, which disables the operation management by the host computer.

SUMMARY OF THE INVENTION

The present invention has been made to remove the above drawbacks, and has its object to provide an output apparatus, having an operation panel for setting the operational environment, available as a local printer provided near a host computer or as a network printer controllable from a remote host computer.

According to the present invention, the foregoing object is attained by providing an output apparatus connectable to an information processing apparatus via a communication medium, comprising: first operational-environment setting means for setting the operational environment in accordance with an instruction from an operation unit; second operational-environment setting means for setting the operational environment in accordance with an instruction from the information processing apparatus via the communication medium; prohibition means for prohibiting setting of the operational environment by the first operational-environment setting means;

selection means for selecting the setting the first operational-environment setting means or the second operational-environment setting means unless the setting of the operational environment by the first operational-environment setting means is prohibited; and output means for outputting information supplied from the information processing apparatus via the communication medium, in accordance with the operational environment set by one of the first and second operational-environment setting means selected by the selection means.

Preferably, the output apparatus of the present invention further comprises control means for controlling the communication medium so that the setting of the operational environment by the second operational-environment setting means can be performed while the prohibition means prohibits the setting of operational environment by the first operational-environment setting means.

Preferably, in the output apparatus of the present invention, the prohibition means prohibits the setting of the operational environment by the first operational-environment setting means by prohibiting the instruction from the operation unit.

Preferably, in the output apparatus of the present invention, the first operational-environment setting means has electric-signal input means for inputting the status of the operation unit as an electric signal, and the first operational-environment setting means sets the operational environment in accordance with the input electric signal, and the prohibition means prohibits the setting of operational environment by the first operational-environment setting means by masking the input electric signal.

Preferably, in the output apparatus of the present invention, the prohibition means prohibits the setting of operational environment by the first operational-environment setting means, in accordance with an instruction from a user.

Preferably, in the output apparatus of the present invention, the prohibition means prohibits the setting of the operational environment by the first operational-environment setting means, in accordance with an instruction from the information processing apparatus.

Preferably, in the output apparatus of the present invention, the output means has image-output means for outputting an image on a print medium, based on information obtained from the information processing apparatus.

Further, the foregoing object is attained by providing a control method for controlling an output apparatus connectable to an information processing apparatus via a communication medium, wherein the output apparatus has a first operational-environment setting the mode for setting operational environment in accordance with instruction from an operation unit, and a second operational-environment setting mode for setting the operational environment in accordance with an instruction from the information processing apparatus via the communication medium, the control method comprising: a judgment the step of judging status of control information as a prohibition or allowance of setting of the operational environment in the first operational-environment setting mode; a mode selection step of selecting the first operational-environment setting mode or the second operational-environment setting mode, if the status of the control information is judged at the judgment step as the allowance of the setting of operational environment in the first operational-environment setting mode; a prohibition step of prohibiting the setting of operational environment in the first operational-environment setting mode, if the status of the control information is judged at the judgment step as the prohibition of the setting of operational environment in the first operational-environment setting mode; and an output step of outputting information supplied from the information processing apparatus via the communication medium, in accordance with the operational environment set in one of the first and second operational-environment setting modes selected at the mode selection step.

Preferably, the output control method of the present invention, further comprises a control step of controlling the communication medium so that the setting of the operational environment in the second operational-environment setting mode can be performed while the setting of the operational environment in the first operational-environment setting mode is prohibited at the prohibition step.

Preferably, in the output control method of the present invention, at the prohibition step, the setting of the operational environment in the first operational-environment setting mode is prohibited by prohibiting the instruction from the operation unit.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a memory map of a working RAM according to the first embodiment;

FIG. 3 is a flowchart showing control of the output apparatus according to the first embodiment;

FIG. 13 is an example and outline of printing environment;

FIGS. 14A to 14T are display examples on a display B6 of the operation panel 12;

FIG. 14U is display example on host computer; and

FIGS. 15 to 17 are examples of display images for explaining a fifth embodiment of the present invention.

DETAILED DESCRIPTION OF THE PREFERRED EMBODIMENTS

Preferred embodiments of the present invention will now be described in detail in accordance with the accompanying drawings.

[First Embodiment]

As an output apparatus to which the present embodiment is applied, a laser-beam printer, an ink-jet printer and printers based on the other printing methods can be provided.

Figure 1:
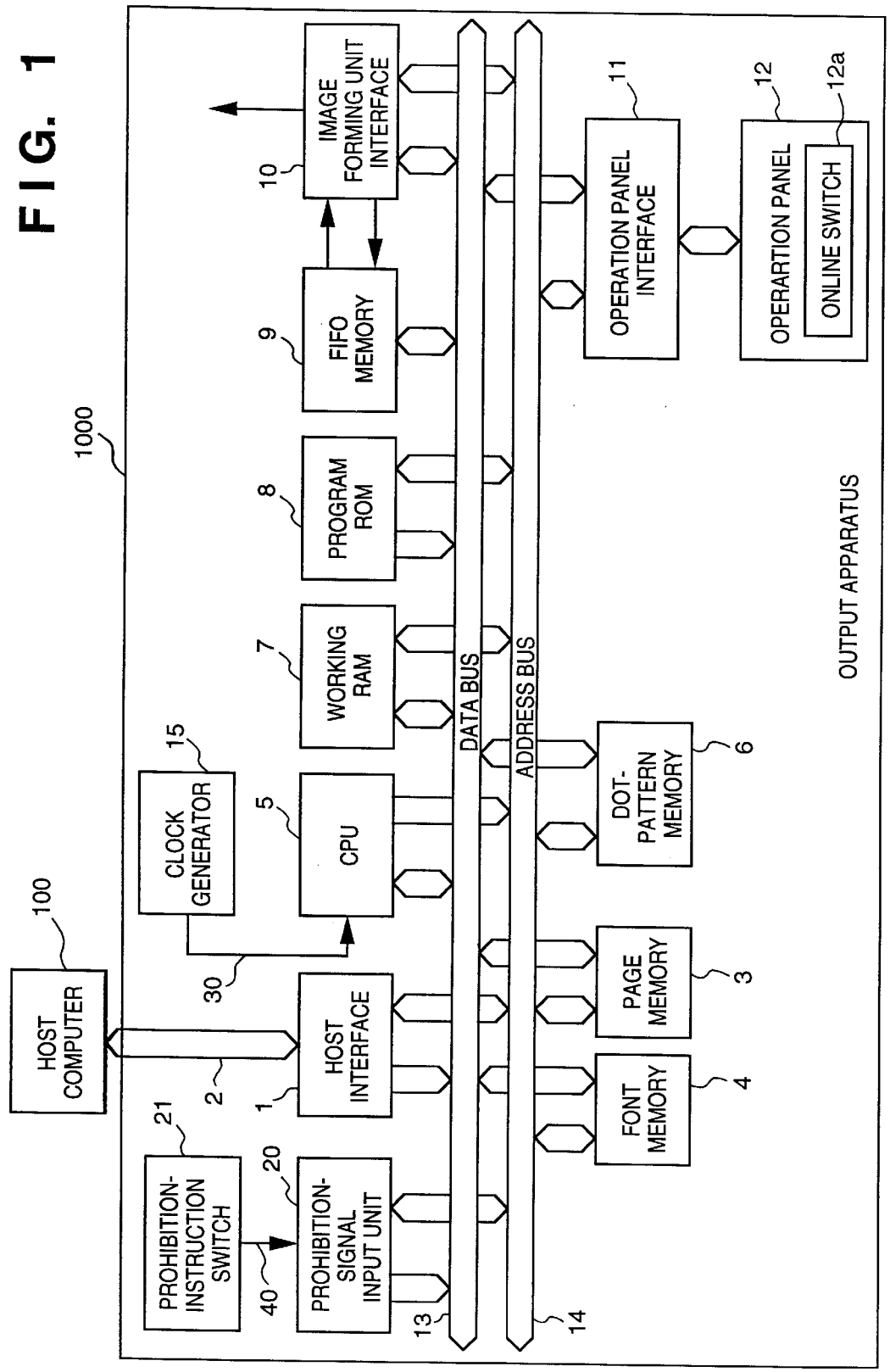
FIG. 1 is a block diagram showing the construction of an output apparatus according to a first embodiment.

FIG. 1 is a block diagram showing the [hardware] construction of an output apparatus according to a first embodiment of the present invention.

In FIG. 1, reference numeral 1 denotes a host interface for communication between an output apparatus 1000 and a host computer 100 which supplies output information to the output apparatus 1000. A communication signal from the output apparatus 1000 is outputted via the host interface 1 to the host computer 100, and on the other hand, a communication signal from the host computer 100 is inputted into the output apparatus 1000 via the host interface 1.

Numeral 2 denotes a communication line for connection between the output apparatus 1000 and the host computer 100.

Image information, inputted into the output apparatus 1000 as code data through the host interface 1, is stored into a page memory 3 under the control of a CPU 5. The page memory 3 has a capacity for storing code data for at least one page. It is used for storing character codes, figure-formation information and control information, sequentially transmitted from the host interface 1.

Numeral 4 denotes a font memory holding character pattern data corresponding to the character codes. The CPU 5 accesses the font memory 4 based on the character code data stored in the page memory 3, in accordance with a processing program such as an interpreter stored in a program ROM 8, for interpreting code data of the character codes, figure information and control information, to read corresponding pattern data from the page memory 3 and maps dot patterns in a dot-pattern memory 6.

The program ROM 8 also holds control programs to be used by the CPU 5 for controlling the overall apparatus. Numeral 7 denotes a working RAM used as a work area for temporarily reading/writing various data for the CPU 5 upon performing processing in accordance with the program in the program RAM 8.

The dot-pattern memory 6 is used for storing the dot patterns, mapped in accordance with a processing program in the program ROM 8 for mapping dot-pattern data. The pattern data for at least one page can be stored in the dot-pattern memory 6 in correspondence with the code data in the page memory 3.

Numeral 9 denotes an FIFO (First In First Out) memory for inputting the dot-pattern data from the dot-pattern memory 6 and outputting the data to an image forming unit interface 10. The image forming unit interface 10 transmits the image data (dot-pattern data) from the FIFO 9 to an image forming unit (not shown) such as a printer.

Numeral 12 denotes an operation panel for operator's manual input. The operation panel 12 has an online switch 12a for the operator to perform online/offline setting of the host interface 1, and switches for setting operational environment of the output apparatus 1000. A signal inputted from the operation panel 12 is inputted via an operation panel interface 11 into the CPU 5 connected to a data bus 13 and an address bus 14. Note that the setting of the operational-environment of the output apparatus 1000 can also be made from the host computer 100 via the host interface 1, as well as from the operation panel 12.

Figure 12:
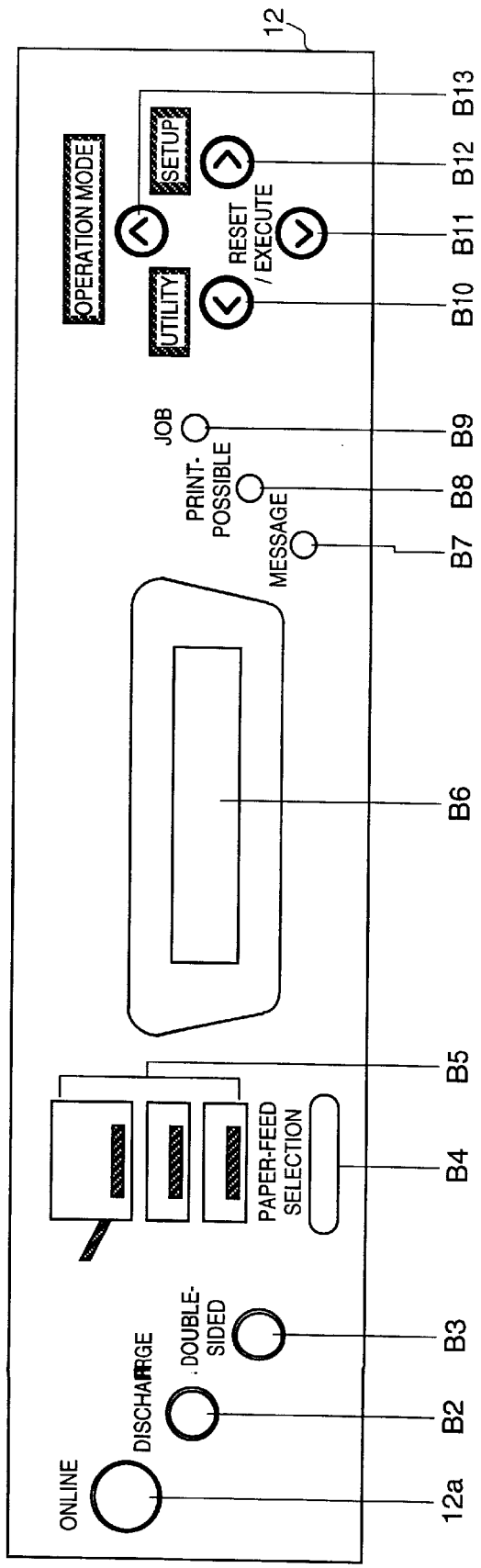
FIG. 12 is an example of the operation panel 12.

FIG. 12 shows an example of the operation panel 12.

If an ONLINE key 12a is pressed, the connection with the computer is turned on (online)/off (offline). The ONLINE key 12a has an internal online lamp that is on during the online period and is off during the offline period. The online lamp blinks during a transitional period from the online to the offline status or vice versa. When the functions of another key is used, the ONLINE key 12a should be pressed to disconnect from the computer (offline). Further, if an error occurs and the printer is stopped, the error status can be removed by pressing this key so as to continue printing.

If the reception of print data or printing is stopped due to any cause, a JOB lamp B9 might remain on (in-use status).

In this case, when a DISCHARGE key B2 is pressed in offline status, if the data still exists in the memory, the data is forcibly print-outputted. If there is no data in the memory, the job is terminated (the JOB lamp B9 is turned off).

When data in the memory is forcibly print-outputted, a message "05 discharging" is displayed on a display B6.

In a case where an optional double-sided printing unit is attached, when a DOUBLE-SIDED key B3 is pressed, single-sided printing and double-sided printing are switched over. When the double-sided printing is instructed, an internal lamp of the DOUBLE-SIDED key B3 is turned on.

If a PAPER-FEED SELECTION key B4 is pressed, a paper-feed selection menu is displayed on the display B6. Paper feeding can be made by "automatic", "paper cassette" and "paper tray". When an optional paper cassette is attached, one of an upper cassette, a middle cassette, and a lower cassette can be selected. The selected feeder (paper cassette or paper tray) can be confirmed with lamps B5 above the PAPER-FEED SELECTION key B4 or the display B6. Further, the paper size of the paper tray can be changed by pressing the PAPER-FEED SELECTION key B4 for three seconds or longer.

A MESSAGE lamp B7 is turned on when the printer is not capable of printing due to some trouble.

A PRINT-POSSIBLE lamp B8 is turned on when printing is possible. A PRINT-POSSIBLE lamp B8 starts blinking right after the printer is turned on until the printer is ready for printing.

A JOB lamp B9 blinks while print data is processed, and is on while printing is executed (on the job).

FIG. 13 shows an example of the printing environment set in the present embodiment and its outline.

Hereinbelow, the operational environment of the output apparatus 1000 and operation procedure of the operation panel 12 for setting the operational environment will be described with reference to FIGS. 14A to 14U.

In a case where "paper-feed selection" is set from the operation panel 12, the key B4 is pressed in the offline status. At this time, the paper-feed selection menu as shown in FIG. 14A is displayed on the display B6. If a key B10, B12 or B4 is pressed, the display of paper-feeder changes (FIG. 14B). If a key B11 is pressed while a desired paper-feeder is displayed, the display changes as shown in FIG. 14C, where the paper-feeder is determined.

If "tray" is selected in the "paper-feed selection", the size of paper set in the paper tray can be set. In this case, the key B4 should be pressed in the offline status till the display changes as shown in FIG. 14D. The paper size is changed (FIG. 14E) by pressing the keys B10 and B12. If the key B11 is pressed while a desired paper size is displayed, the display changes to any of the displays shown in FIG. 14C (A4) and 14F (free size selection). Thus a desired paper size can be set.

To set a "binding margin", first of all, a key B12 should be pressed in the offline status in order to display a message as shown in FIG. 14G on the display B6. At this time, if the key B10 or B12 is pressed, the under-half part of the display sequentially changes. When it is as shown in FIG. 14H, the key B11 is pressed, then the display changes as shown in FIG. 14I. At this time, if the key B10 or B12 is pressed, the under-half part of the display sequentially changes. When it is as shown in FIG. 14J, the key B11 is pressed, and then the display changes as shown in FIG. 14K. At this time, if the key B10 or B12 is pressed, the display changes as shown in FIG. 14L. When a desired binding direction is displayed, if the key B11 is pressed, the direction is set, and the display returns to the display as shown in FIG. 14J.

When "layout" is displayed as shown in FIG. 14J, if a display as shown in FIG. 14M is made by pressing the key B10 or B12 and then the key B11 is pressed, the display changes as shown in FIG. 14N. At this time, the binding margin can be increased or decreased by manipulating the keys B10 and B12, and the key B11 is pressed when a desired binding margin is displayed, whereby the binding margin is determined.

To set a "resolution", first, the key B12 should be pressed in the offline status to display a "setup" menu. If the key B10 or B12 is pressed, the under-half part of the display sequentially changes. The key B11 should be pressed when the display is as shown in FIG. 14O. This displays a "printing adjustment" menu as shown in FIG. 14P, and if the key B11 is pressed when "resolution" is displayed (FIG. 14P), the display changes to as shown in FIG. 14Q. The display "quick" changes to "fine" by pressing the key B10 or B12. When a desired resolution is displayed, if the key B11 is pressed, the resolution is set, and the display returns to FIG. 14P.

To set "number of copies" or "toner density", first, in the above-mentioned "setup" menu display, "expanded function" should be displayed and the key B11 should be pressed. As the display is as shown in FIG. 14R, the number of copies can be set by pressing the key B11. Further, to set the "toner density", the key B10 or B12 should be manipulated while the display as shown in FIG. 14R is made. Then the display changes to "toner density" as shown in FIG. 14S. At this time, if the key B11 is pressed, the display changes to that as shown in FIG. 14T, and the numeric value as in FIG. 14T can be increased or decreased by manipulating the key B10 or B12. If the key B11 is pressed when a desired numeric value is displayed, a toner density corresponding to the numeric value is set.

Note that the above-described series of setting is an example, and other various settings of printing environment, e.g., enlargement/reduction, orientation of paper, toner-saving mode, and overlay printing, can be set.

When the setting of the desired environment has been completed, if the key 12a is pressed to change the offline status to online status, printing becomes possible.

In a case where the above-described setting of printing environment is made from an external host computer, a display window as shown in FIG. 14U is displayed on a display image for operation of a mouse or the like. As desired setting contents are displayed on the display image, if a "transmission" button image is clicked, the set contents are transferred to the printer, and thus the settings become valid.

Numeral 30 denotes a clock signal outputted from a clock generator 15, used as a clock signal for the CPU 5; 20 denotes a prohibition-signal input unit; 21, a prohibition-instruction switch; and 40, a prohibition signal to instruct prohibition of input from the operation panel 12 for setting the operational-environment. When the level of the prohibition signal 40 is High, the input from the operation panel 12 for setting the operational-environment is impossible (input-prohibition status), while when the level of the prohibition signal 40 is Low, the input from the operation panel 12 is possible (input-enable status).

In prohibition status, all the keys on the operation panel 12 shown in FIG. 12 (ONLINE, DISCHARGE, DOUBLE-SIDED, PAPER-FEED SELECTION, UTILITY, RESET/EXECUTE, SETUP, OPERATION MODE) cannot be operated, and any function assigned to its corresponding key is not fulfilled even if it the key is pressed. However, in this prohibition status, all the display functions on the operation panel (ONLINE, DISCHARGE, DOUBLE-SIDED, PAPER-FEEDER display lamp, DISPLAY, MESSAGE lamp, PRINT-POSSIBLE lamp, JOB lamp) can function normally.

The prohibition-instruction switch 21 is used for controlling the prohibition signal 40. This switch comprises a setting-maintaining type switch (e.g. a toggle switch) which, once set to a predetermined status, maintains the set status until the switch status is changed. The setting of the prohibition-instruction switch 21 maintains the prohibition signal 40 at the High or Low level. The prohibition signal 40 controlled by the prohibition-instruction switch 21 is inputted into the CPU 5 connected to the data bus 13 and the address bus 14 via the prohibition-signal input unit 20.

FIG. 2 is a memory map of the working RAM 7 used by the CPU 5. FIG. 3 is a flowchart showing input processing in the hardware construction according to the first embodiment, by using the memory map of the working RAM 7 in FIG. 2.

Note that the input processing routine shown in FIG. 3 is called in accordance with a control program stored in the program ROM 8 in FIG. 1 when input has been made from the operation panel 12 or the prohibition-instruction switch 21.

In the working RAM 7, a forced-termination completion flag 50 indicates the completion of forced-termination processing to forcibly terminate input processing from the operation panel 12 when prohibition of input from the operation panel 12 for the various operational-environment settings is instructed from the prohibition-instruction switch 21. When the forced-termination processing has been completed, the flag value is set to "1", and since then, the set flag value "1" is maintained as far as the prohibition status continues. Otherwise, the flag value is set to "0". Immediately after the power of the output apparatus 1000 has been turned on, the flag value of the forced-termination completion flag 50 is set to "0" as the initial value.

The forced-termination processing of the present embodiment can occur when the setting of the operational environment is as shown in FIGS. 14A to 14T by using the operation panel shown in FIG. 12. If the forced-termination processing is performed, the series of operation processes by that time is canceled, and the status immediately before the setting operation is restored (note that online status is maintained).

In FIG. 3, at step S10, the level of the prohibition signal 40 is examined to determine the following process flow. At step S10, whether or not the level of the prohibition signal 40 is High or Low (i.e., it is in prohibition status or not) is determined. If the signal level is Low (input enable status), the process proceeds to step S11, at which the value of the forced-termination completion flag 50 is set to "0". At step S12, the setting of the operational environment of the output apparatus 1000 is performed by input from the operation panel 12. The input processing at step S12 includes processing to set the host interface 1 to online status or offline status based on the status of the online switch 12a.

On the other hand, if the level of the prohibition signal 40 is High (prohibition status), the process proceeds to step S13, to perform processing to forcibly set the host interface 1 to the online status. At step S14, whether or not the value of the forced-termination completion flag 50 is "1" is examined. If the flag value is "1", the input processing routine ends.

At step S14, if the value of the forced-termination completion flag 50 is not "1", the process proceeds to step S15, at which processing to forcibly terminate the input processing from the operation panel 12 for the setting of the operational-environment (forced-termination processing) is performed. Thereafter, at step S16, the value of the forced-termination completion flag 50 is set to "1" indicative of the completion of the forced termination processing, and the process ends.

Figure 11:
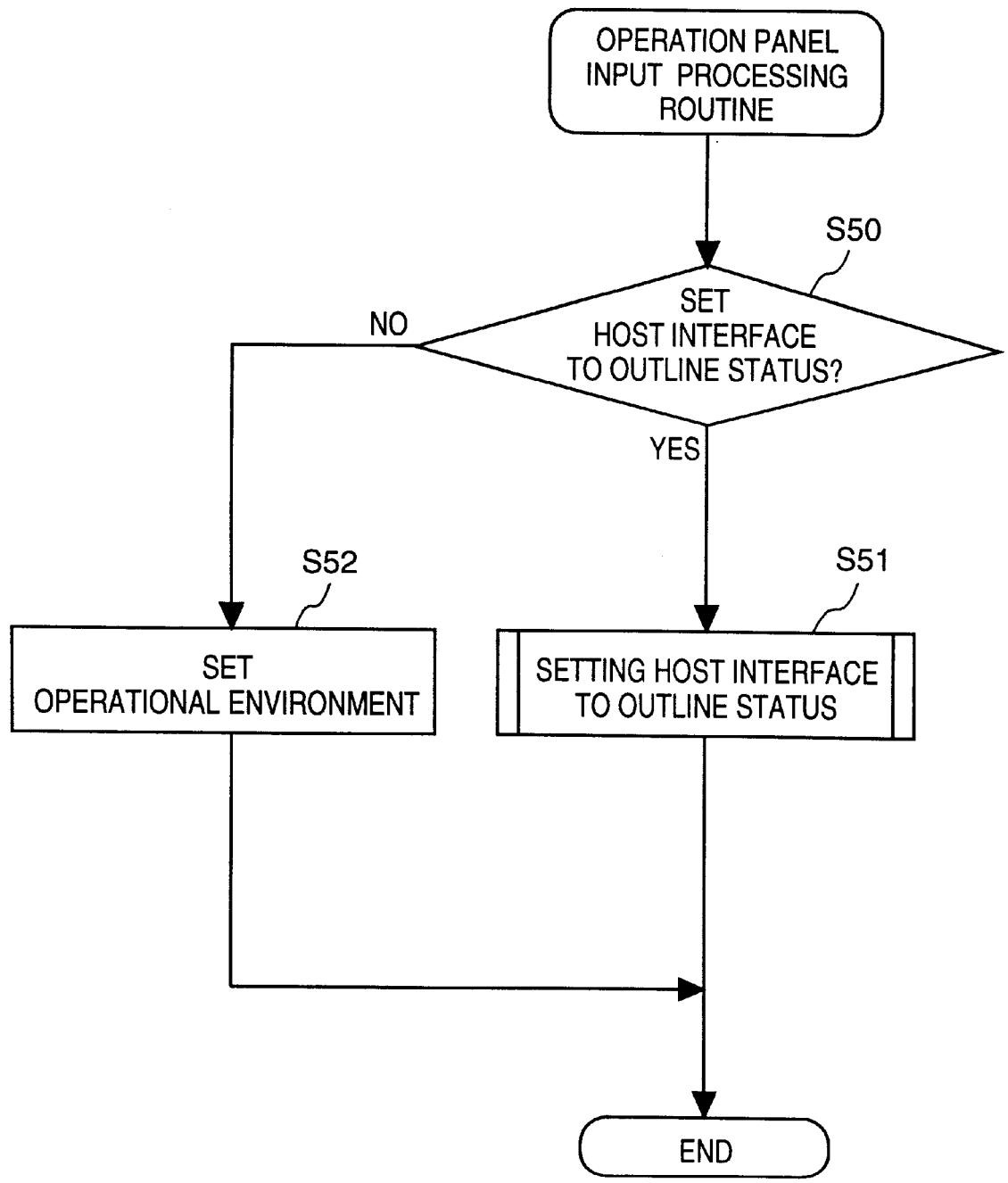
FIG. 11 is a flowchart showing input processing at an operation panel 12 according to the first, third and fourth embodiments.

FIG. 11 is a flowchart showing the input-processing at the operation panel 12 at step S12 in FIG. 3. At step S50, whether or not input from the operation panel 12 instructs the setting of the host interface 1 to the online status is determined. If YES, the process proceeds to step S51, at which the host interface 1 is set to the online status. In this status, the operational environment of the output apparatus 1000 is set by the host computer 100. On the other hand, if NO at step S50, the process proceeds to step S52, at which the operational environment for the output apparatus 1000 is set in accordance with the input from the operation panel 12.

In a case where the input from the operation panel 12 represents the prohibited status, in order to set the operational environment of the output apparatus 1000 from the operation panel 12, first the prohibition-instruction switch 21 must be manipulated to cancel the prohibition status, then the online switch 12a must be manipulated to set the output apparatus 1000 to the offline status. Merely manipulating the online switch 12a does not set the host interface 1 to offline status unless the prohibition status is canceled.

According to the first embodiment, while the operation of the output apparatus 1000 is managed from the host computer 100, if input from the operation panel 12 to change the conditions set by the host computer 100 is not desired, the input from the operation panel 12 can be prohibited by using the prohibition-instruction switch 21. Accordingly, inadvertent change of the operational environment of the output apparatus 1000 can be avoided, thus preventing the problem of erroneous output from the output apparatus 1000.

Further, according to the present embodiment, when the prohibition-instruction switch 21 is manipulated to prohibit input from the operation panel 12, the host interface 1 is set to the online status. This solves the problem in that the output apparatus 1000 is set to the offline status and the operation of the output apparatus 1000 cannot be managed from the operation controls.

[Second Embodiment]

Figure 4:
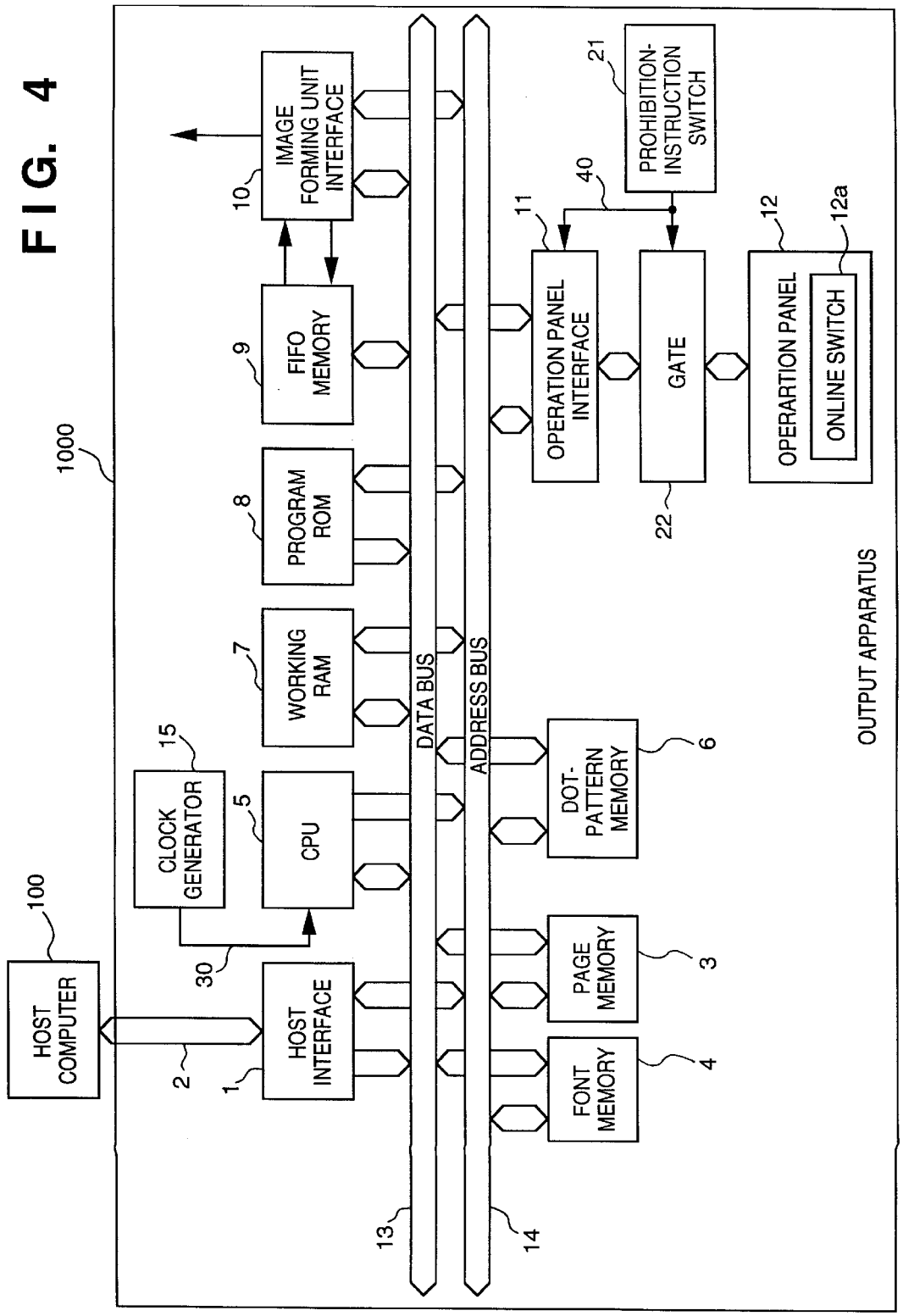
FIG. 4 is a block diagram showing the construction of the output apparatus according to the second embodiment.

FIG. 4 is a block diagram showing the construction of the output apparatus according to the second embodiment.

In FIG. 4, the elements corresponding to those in FIG. 1 according to the first embodiment have the same reference numerals and the explanations of these elements will be omitted. In FIG. 4, the construction does not have the prohibition-signal input unit 20. The prohibition signal 40 as the output of the prohibition-instruction switch 21 is supplied to a gate 22 and the operation panel interface 11.

That is, in the second embodiment, the prohibition signal 40 is inputted into the gate 22 and the operation panel interface 11. The gate 22 controls whether or not the input from the operation panel 12 is transferred to the control panel interface 11.

That is, if the level of the prohibition signal 40 is High, the gate 22 masks the signal inputted from the operation panel 12 to the operation panel interface 11, while if the level of the prohibition signal 40 is Low, the gate 22 transfers the signal inputted from the operation panel 12 to the operation panel interface 11.

The first embodiment provides software to allow or permit input from the operation panel 12 for various operational-environment settings of the output apparatus 1000, in accordance with the status of the prohibition-instruction switch 21 provided at the output apparatus 1000. In contrast, the second embodiment in FIG. 4 prohibits the input from the operation panel to accomplish the same objective.

The prohibition signal 40, inputted into the operation panel interface 11, is inputted into the CPU 5 connected to the data bus 13 and the address bus 14 via the operation panel interface 11, with the signal inputted/or not inputted into the operation panel interface 11, under the control of the gate 22, from the operation panel 12.

Figure 5:
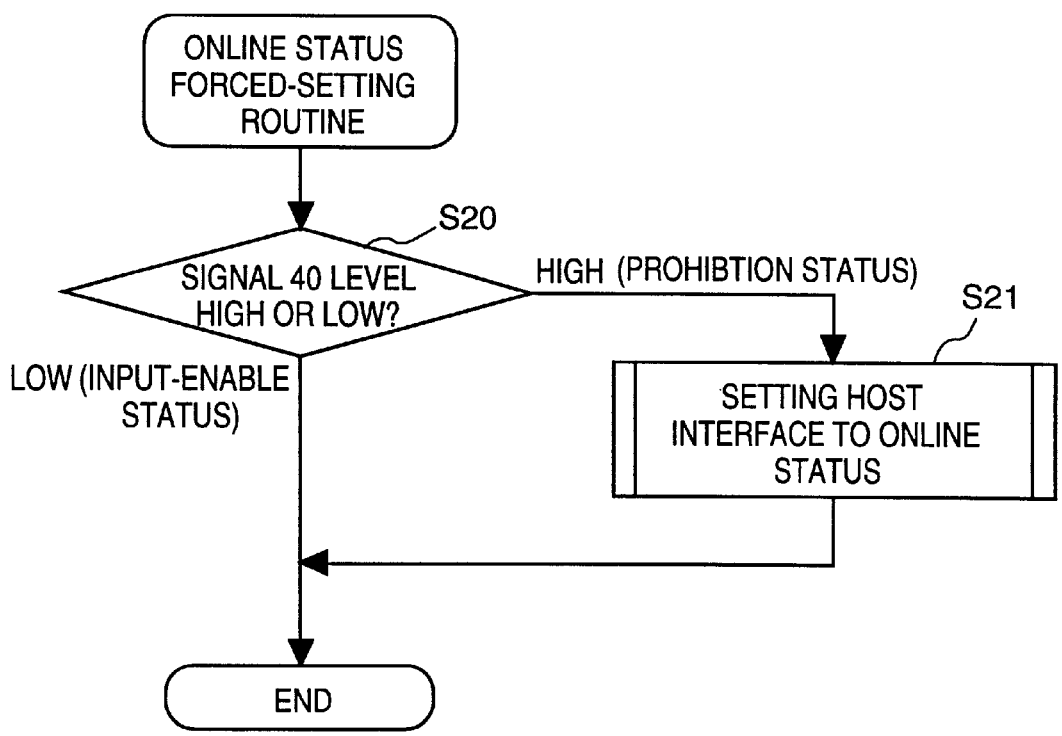
FIG. 5 is a flowchart showing control of the output apparatus according to the second embodiment.

FIG. 5 is a flowchart showing processing to forcibly set the host interface 1 to the online status and maintain the set status if the input from the operation panel 12 for setting the operational environment of the output apparatus 1000 is prohibited.

This processing is performed by executing a control program stored in the program ROM 8 shown in FIG. 4, by the CPU 5.

In FIG. 5, at step S20, the level of the prohibition signal 40 is examined to determine the following process flow. If the level of the prohibition signal 40 is High (prohibition status), the process proceeds to step S21 at which the host interface 1 is set to the online status.

On the other hand, if the level of the prohibition signal 40 is Low (input-enable status), the process ends.

As described above, the second embodiment realizes [hardware construction] to prohibit or allow setting of the operational-environment from the operation panel 12 in accordance with the set status of the prohibition-instruction switch 21.

[Third Embodiment]

Figure 10:
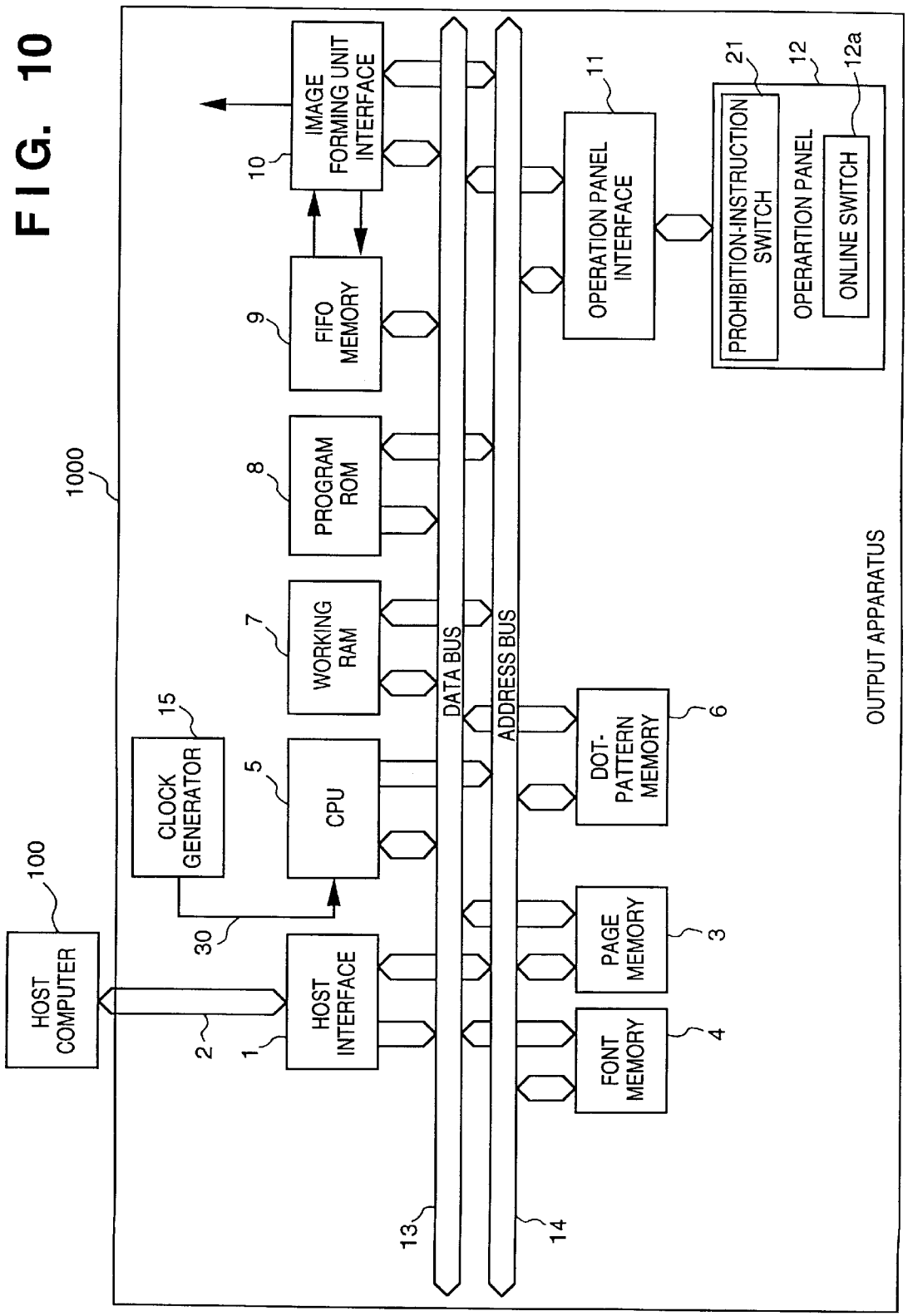
FIG. 10 is a block diagram showing the construction of the output apparatus according to the third and fourth embodiments.

Next, a third embodiment of the present invention will be described with reference to FIGS. 6, 7 and 10. FIG. 10 is a block diagram showing the construction of the output apparatus according to the third embodiment. The third embodiment differs from the first embodiment in that the prohibition-instruction switch 21 is provided on the operation panel 12. Accordingly, the function corresponding to the prohibition-signal input unit 20 is possessed by the operation panel interface 11.

In the third embodiment, the allowance/prohibition of setting the operational environment of the output apparatus 1000 from the operation panel 12 is made by the prohibition-instruction switch 21 on the operation panel 12.

Figure 6:
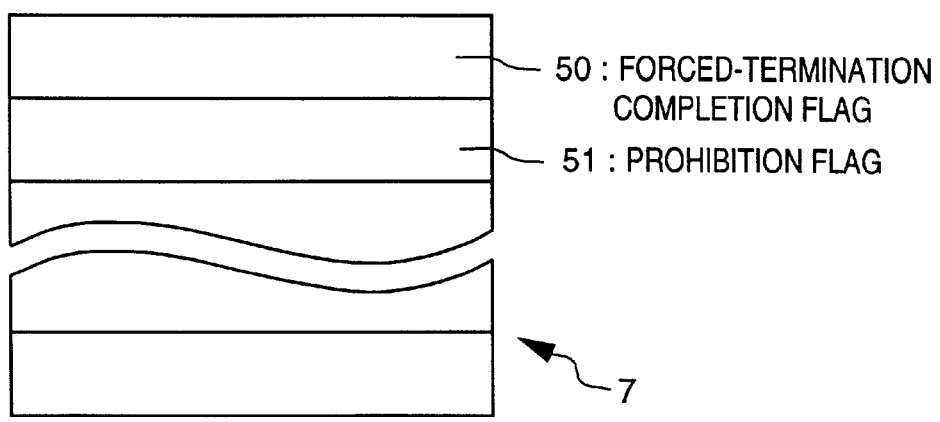
FIG. 6 is a memory map of the working RAM according to a third embodiment.

FIG. 6 is a memory map of the working RAM 7 used by the CPU 5. FIG. 7 is a flowchart showing input processing in the hardware construction according to the third embodiment, by using the memory map of the working RAM 7 in FIG. 6.

Figure 7:
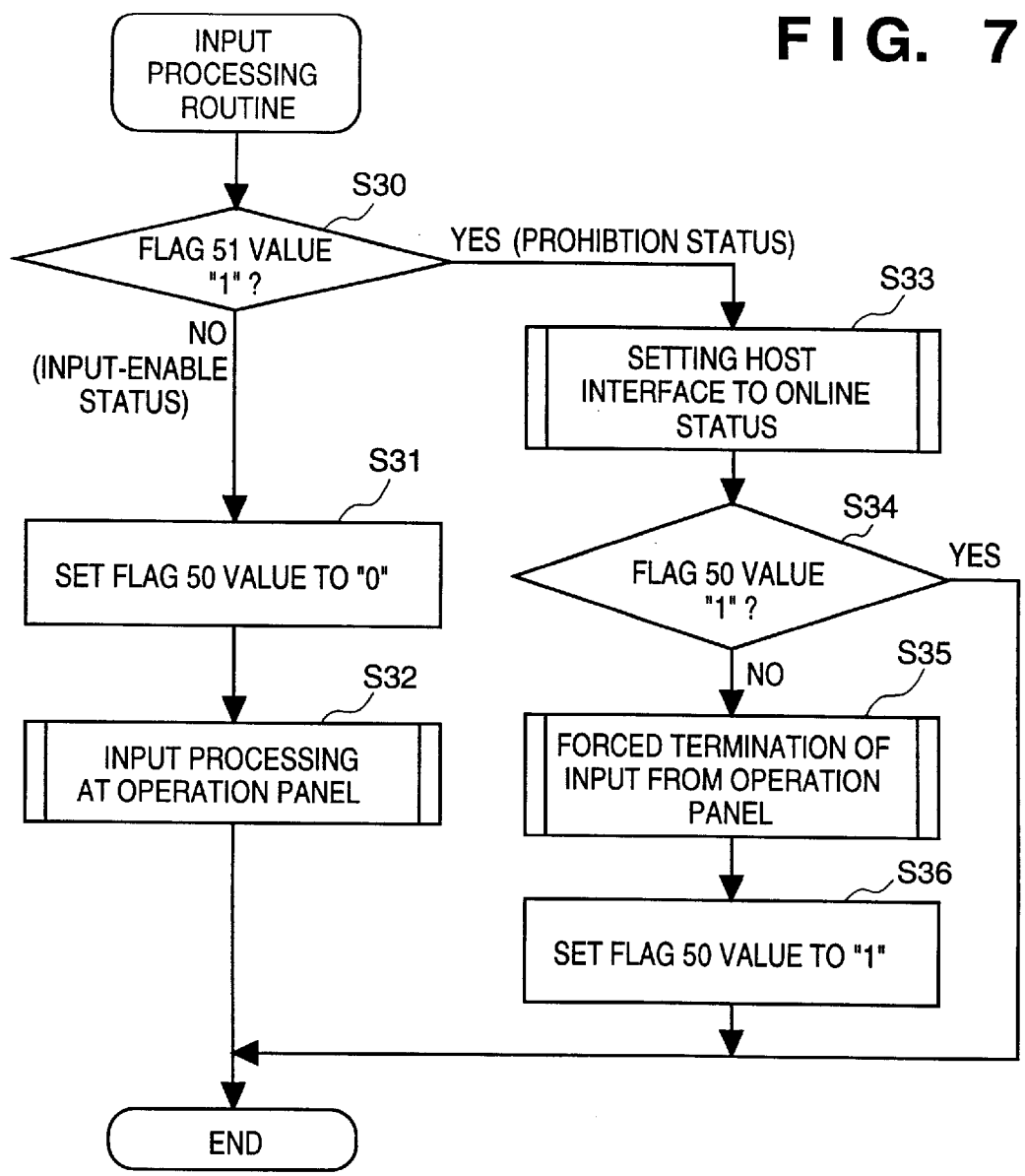
FIG. 7 is a flowchart showing control of the output apparatus according to the third embodiment.

Note that the input processing routine shown in FIG. 7 is performed by the CPU 5 in accordance with a control program stored in the program ROM 8.

As shown in FIG. 6, the working RAM 7 holds the forced termination completion flag 50 and a prohibition flag 51.

The prohibition flag 51 has a value which is set to "0" or "1" in accordance with an instruction from the prohibition-instruction switch 21. If the setting of the operational environment of the output apparatus 1000 from the operation panel 12 is prohibited, the value of the prohibition flag 51 is set to "1", while if the setting from the operation panel 12 is allowed, the value of the prohibition flag 51 is set to "0". Immediately after the power of the output apparatus 1000 has been turned on, the value of the flag 51 is set to "0" as the initial value. Note that even when the setting of the operational environment of the output apparatus 1000 from the operation panel 12 is prohibited, input from the prohibition-instruction switch 21 is possible.

In FIG. 7, at step S30, the value of prohibition flag 51 is examined. If the value of the prohibition flag 51 is not "1", the process proceeds to step S31 where the value of the forced-termination completion flag 50 is set to "0". Then at step S32, the setting of the operational environment of the output apparatus 1000 is performed from the operation panel 12. Note that the processing at step S32 is as described in detail in the flowchart of FIG. 11.

On the other hand, if the value of the prohibition flag 51 is "1" at step S30, the process proceeds to step S33, at which the host interface 1 is forcibly set to the online status. At step S34, the value of the forced-termination completion flag 50 is examined. If the value of the forced-termination completion flag 50 is "1", the process ends.

On the other hand, if the value of the forced-termination completion flag 50 is not "1", the process proceeds to step S35, at which the forced-termination processing is performed to forcibly terminate the setting of the operational environment of the output apparatus 1000 input from the operation panel 12. At step S36, the value of the forced-termination completion flag 50 is set to "1" indicative of the completion of the forced-termination processing, and the process ends.

The prohibition status against the setting of the operational-environment from the operation panel 12 can be canceled by using the prohibition-instruction switch 21 if input from the prohibition-instruction switch 21 is always possible. In a case where the output apparatus 1000 is set such that the input from the prohibition-instruction switch 21 is impossible in the prohibition status against the setting of the operational-environment from the operation panel 12, the prohibition status can be canceled by resetting the output apparatus 1000 otherwise shutting down the power of the apparatus and restarting the apparatus.

The function of the prohibition-instruction switch 21 may be realized by the combination of other switches of the operation panel 12. For example, the combination of a paper-feed switch for instructing to feed discharge print paper with the online switch 12*a* can be employed.

As described above, the function for instructing prohibition of the setting of the operational environment by the operation panel 12 or canceling the prohibition can be fulfilled by various constructions. The prohibition-instruction switch as described above may be provided at the other elements than the operation panel 12. Otherwise it may be replaced with other switches having other functions or with other devices than the switches.

[Fourth Embodiment]

Next, a fourth embodiment of the present invention will be described with reference to FIGS. 8 and 9. Similar to the third embodiment, the fourth embodiment has hardware construction shown in FIG. 10 substantially identical to FIG. 1. In the fourth embodiment, the prohibition or allowance of the setting of the operational environment of the output apparatus 1000 from the operation panel 12 is determined based on a command from the host computer 100. The prohibition-instruction switch 21 may be omitted. However, in consideration of the diversity of functions, it is preferable to provide the prohibition-instruction switch 21.

Figure 8:
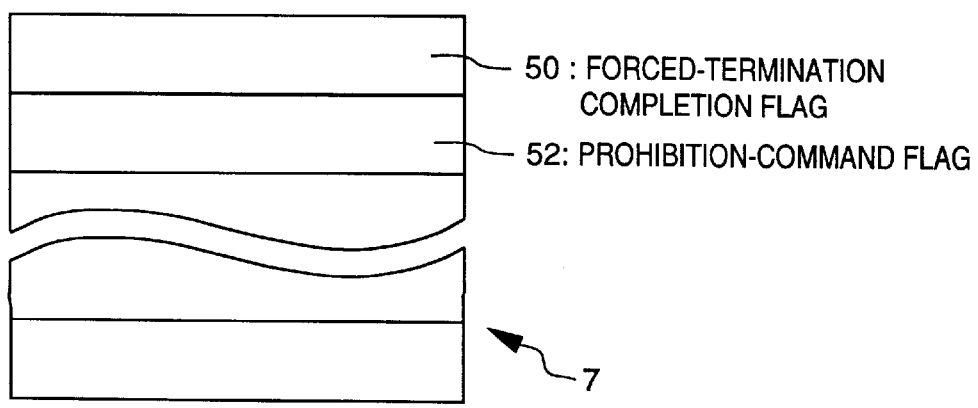
FIG. 8 is a memory map of the working RAM according to a fourth embodiment.

FIG. 8 is a memory map of the working RAM 7 used by the CPU 5. FIG. 9 is a flowchart showing input processing in the hardware construction in FIG. 10 having the memory map of the working RAM 7 in FIG. 8 according to the fourth embodiment.

Figure 9:
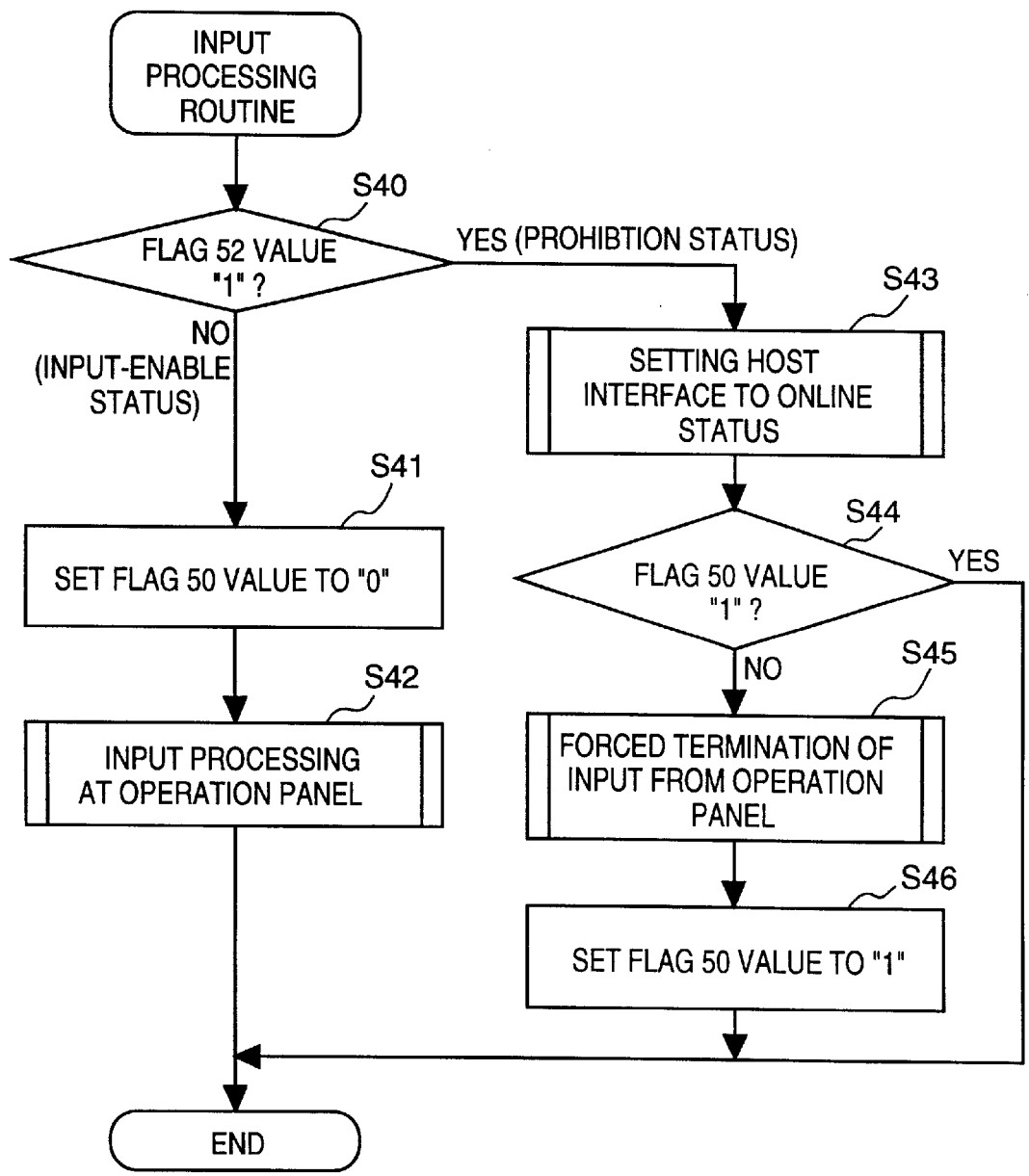
FIG. 9 is a flowchart showing control of the output apparatus according to the fourth embodiment.

Note that the input processing routine shown in FIG. 9 is performed by the CPU 5 in accordance with a control program stored in the program ROM 8.

The working RAM 7 of the fourth embodiment has the forced-termination completion flag 50 and a prohibition-command flag 52.

If a prohibition command, instructing the prohibition of the setting of the operational environment of the output apparatus 1000 from the operation panel 12, is sent from the host computer 100, the value of the prohibition-command flag 52 is set to "1", while if a cancel command instructing the cancellation of the prohibition is sent from the host computer 100, the value of the prohibition-command flag 52 is set to "0".

Note that immediately after the power of the output apparatus 1000 has been turned on, the value of the prohibition-command flag 52 is set to "0" as an initial value.

In FIG. 9, the value of the prohibition-command flag 52 is examined at step S40. If the value of the prohibition-command flag 52 is not "1", the process proceeds to step S41, at which the value of the forced-termination completion flag 50 is set to "0". At step S42, the setting of the operational environment of the output apparatus 1000 is performed from the operation panel 12. Note that the processing at step S42 is described in detail in the flowchart of FIG. 11.

At step S40, if the value of the prohibition-command flag 52 is "1", the process proceeds to step S43, at which the host interface 1 is forcibly set to the online status. At step S44, the value of the forced-termination completion flag 50 is examined. If the value of the forced-termination completion flag 50 is "1", the process ends.

If the value of the forced-termination completion flag 50 is not "1", the process proceeds to step S45, at which the forced-termination processing is performed to forcibly terminate the setting of the operational environment of the output apparatus 1000 from the operation panel 12. At step S46, the value of the forced-termination completion flag 50 is set to "1" indicating the completion of the forced-termination processing, and the process ends.

The prohibition status against the setting of the operational environment of the output apparatus 1000 from the operation panel 12 is canceled in accordance with the cancel command from the host computer 100. Note that the cancellation of the prohibition status can also be made by resetting the output apparatus 1000 or shutting the power of the apparatus down and restarting the apparatus.

In the fourth embodiment, the setting of the operational environment of the output apparatus 1000 from the operation panel 12 can be prohibited or allowed by transmitting the prohibition command or the cancel command from the host computer 100. The present invention is also applicable where the host computer 100 performs the prohibition/allowance of the setting of the operational environment of the output apparatus 1000 via a dedicated signal line connecting the host computer 100 with the output apparatus 1000.

According to the fourth embodiment, the setting of the operational environment of the output apparatus 1000 from the operation panel 12 can be prohibited or allowed by the host computer 100. Accordingly, when the host computer 100 is required to set the operational environment of the output apparatus 1000, it can automatically prohibit the setting from the operation panel 12, thus preventing the operational environment from being inadvertently changed by an input from the operation panel 12. Further, when the host computer 100 is not required to set the operational environment of the output apparatus 1000, it can allow the setting from the operation panel 12.

[Fifth Embodiment]

Next, a fifth embodiment of the present invention will be described with reference to FIGS. 15 to 17. Similar to the third and fourth embodiments, this embodiment has the hardware construction shown in FIG. 10. In this embodiment, the prohibition-instruction switch 21 may be omitted. The setting of operational-environment from the operation panel 12 is prohibited or allowed in accordance with whether or not the output apparatus 1000 is connected to the network. However, in consideration of the diversity of functions, it is preferable to provide the prohibition-instruction switch 21.

FIG. 15 shows the output apparatus 1000 (an output apparatuses (A)1001 and (B)1002) connected to the network. The host interface 1 is connected to a LAN bus 90 via a communication line 2 (Ethernet interface such as 10base-2, 10base-T or 10base-5 respectively connected to a coaxial connector, an RJ45 connector or a DB15 connector (AUI)). The host computer 100 (host computers (A)101, (B)102 and (C)103) is connected to the LAN bus 90.

Figure 16:
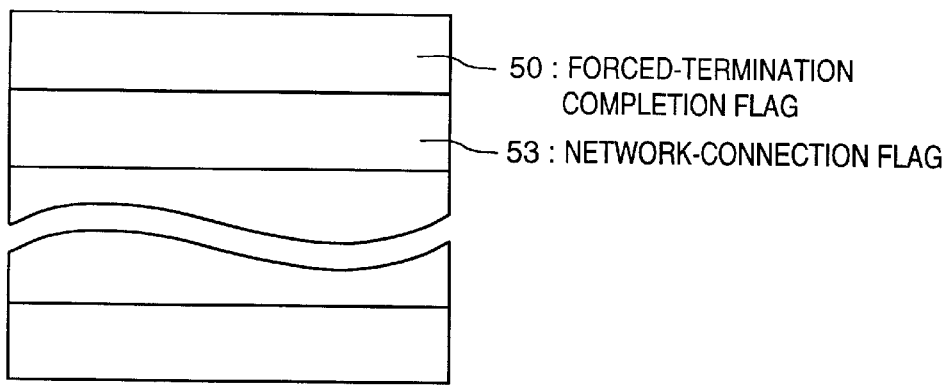

FIG. 16 is a memory map of the working RAM 7 used by the CPU 5 in FIG. 10. FIG. 17 is a flowchart showing the control of the fifth embodiment having the hardware construction in FIG. 10 and the working RAM 7 with the memory map shown in FIG. 16. The control shown in FIG. 17 is executed by the CPU 5 based on a control program stored in the program ROM 8.

The working RAM 7 of the fifth embodiment holds the forced-termination completion flag 50 and a network-connection flag 53.

When the host interface 1 has the function (e.g., Ethernet) of connecting the output apparatus 1000 to the network, and the output apparatus 1000 can communicate with another network-computer (e.g., the host-computer) actually, the network-connection flag 53 is set to "1", and otherwise, it is set to "0". Immediately after the power of the output apparatus 1000 has been turned on, the value of the network-connection flag 53 is set to "0" as an initial value.

Figure 17:
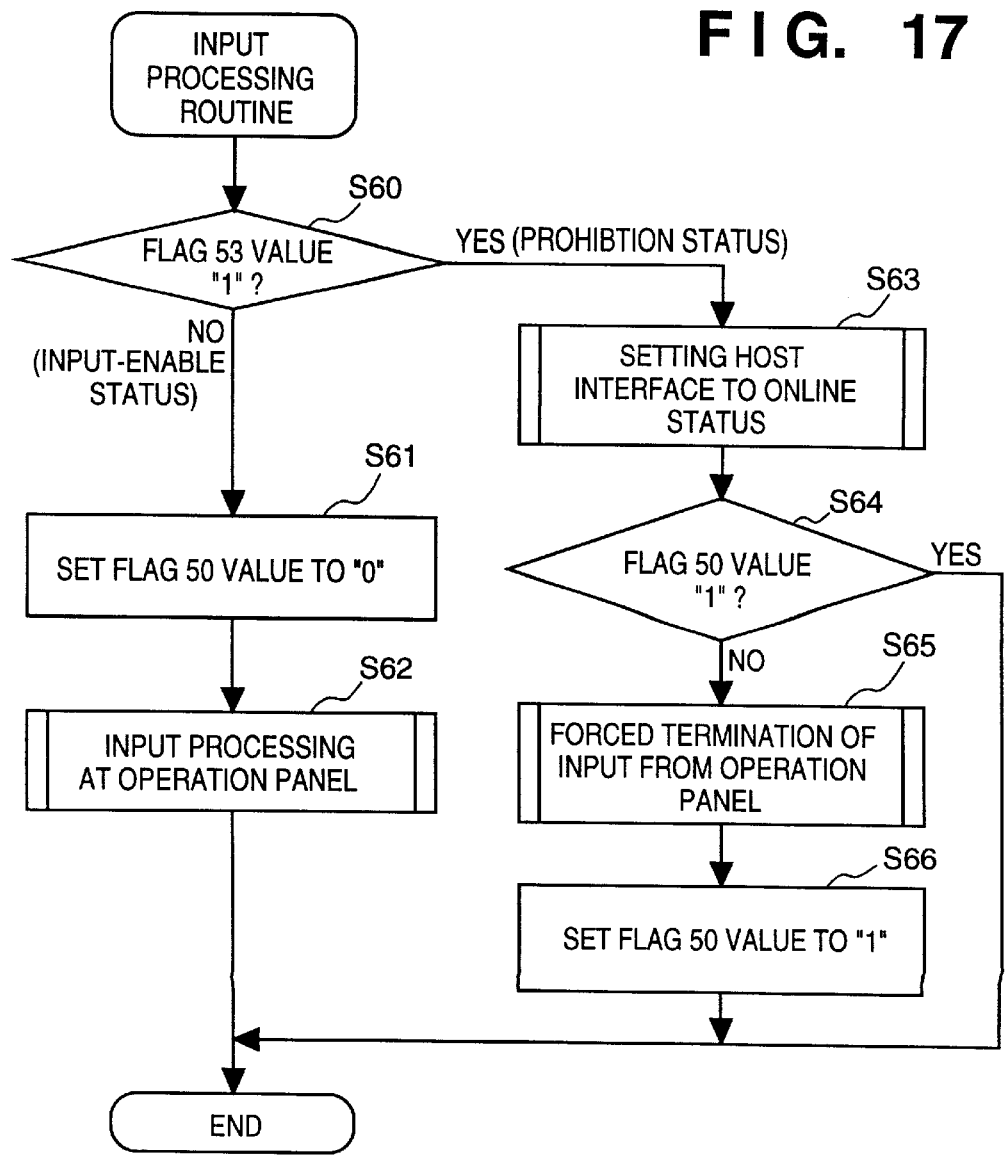

In the flowchart of FIG. 17, first, the set value of the network-connection flag 53 is checked at step S60. If the value is not "1", the process proceeds to step S61, at which the value of the forced-termination flag 50 is set to "0". Next, at step S62, the setting of the operational-environment instructed from the operation panel 12 is performed. Note that the processing at step S62 is as shown in the flowchart of FIG. 11.

At step S60, if the value of the network-connection flag 53 is "1", the process proceeds to step S63, at which the host interface 1 is forcibly set to the online status. Next, at step S64, the value of the forced-termination completion flag 50 is checked. If the flag value is "1", the input processing routine ends.

If the value of the forced-termination completion flag 50 is not "1", the process proceeds to step S65, at which the setting of the operational-environment instructed from the operation panel 12 is forcibly terminated (forced-termination processing). At step S66, the value of the forced-termination completion flag 50 is set to "1" indicative of the completion of the forced termination processing, and the input processing routine ends.

In the present embodiment, the prohibition status of the setting of the operational-environment from the operation panel 12 can be canceled by removing the communication line 2 from the host interface 1 of the output apparatus 1000.

Note that in this embodiment, the output apparatus 1000 has only one host interface for network connection. However, it can be arranged that the output apparatus 1000 has two or more host interfaces. In a case where the output apparatus 1000 has two host interfaces, one is for one-to-one connection with the host (e.g., centronics), and the other, for network connection as described in this embodiment. In this case, the host interface used by the output apparatus 1000 is switched from the interface for the one-to-one connection with the host to the interface for the network connection, in accordance with instruction from the operation panel 12 or a command instruction from the host computer. At the point of switchover, the setting of the operational-environment from the operation panel 12 is prohibited, and the host interface for the network connection is set to online status; on the other hand, in accordance with the command instruction from the host computer, the host interface for the one-to-one connection is activated. Upon switchover from the host interface for the network connection to that for the one-to-one connection, although the output apparatus 1000 is physically connected to the network environment via the communication line 2, it is determined that the network connection is disconnected and the prohibition status of the setting of the operational-environment from the operation panel 12 is canceled. This does not change the subject matter of the present invention.

In the above embodiments, the status of the output apparatus 1000, immediately after the power has been turned on, may be set such that the setting of the operational environment of the output apparatus 1000 from the operation panel 12 is prohibited and the host interface 1 is in the online status. This construction is within the scope of the present invention and it can solve the aforementioned drawback of conventional devices.

As described above, in an output apparatus where the operational environment can be set from a host computer or an operation panel, while the host computer manages the operation of the output apparatus, setting of the operational environment from an operation panel can be prohibited to prevent setting the operational environment different from that set by a host computer.

Further, to ensure the management of the operation of the output apparatus by the host computer, the output apparatus is set to online status while the host computer manages operation of the output apparatus.

Accordingly, the present invention can provide an output apparatus, having an operation panel for setting the operational environment of the apparatus, which can be efficiently used as a local printer provided near a host computer, or a network printer in which the operation is manageable to a remote host computer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, the aforesaid functions according to the above embodiments are realized by executing the program codes which are read by a computer, and the present invention also includes a case where an OS (operating system) or the like working on the computer performs a part or entire processes in accordance with designations of the program codes and realizes functions according to the above embodiments.

Furthermore, the present invention also includes an embodiment where, after the program codes read from the storage medium are written in a function expansion card which is inserted into the computer or in a memory provided in a function expansion unit which is connected to the computer, a CPU or the like contained in the function expansion card or unit performs a part of or the entire process in accordance with designations of the program codes and realizes the functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. A print control apparatus for controlling a printing operation on the basis of an instruction sent from an information processing apparatus, comprising:

first input means for inputting an instruction by a user;

operational-environment setting means for setting an operational environment in one of first and second modes, wherein setting of the environment based on the instruction from said information processing apparatus and said first input means is permitted in the first mode, and wherein setting of the environment based on the instruction from said information processing apparatus is permitted and setting of the environment based on the instruction from said first input means is prohibited in the second mode; and control means for terminating the setting of the operational environment based on the instruction from said first input means in a case where it is instructed to switch the first mode to the second mode while the setting of the operational environment is performed based on the instruction from said first input means in the first mode.

2. The apparatus according to claim 1, further comprising selection means for selecting one of the first and second modes based on the instruction from said information processing apparatus.

3. The apparatus according to claim 1, further comprising means for masking a signal from said first input means in a case where the second mode is selected so that setting of the environment based on the signal is not performed by said operational-environment setting means.

4. The apparatus according to claim 1, further comprising second input means for inputting an instruction, by a user, to switch one of the first and second modes to the other mode.

5. The apparatus according to claim 4, wherein the instruction from said second input means is effective in the second mode as well as in the first mode.

6. The apparatus according to claim 4, wherein each of said first and second input means has at least one key which is provided on a common operation panel.

7. The apparatus according to claim 1, wherein said first input means has a plurality of keys, and wherein selection of one of the first and second modes is instructed by a specific combination of the plurality of keys being manipulated by a user.

8. The apparatus according to claim 1, further comprising determination means for determining if said print control apparatus can communicate with said information processing apparatus through a network, wherein said operational-environment setting means sets the second mode in accordance with a positive determination result by said determination means.

9. The apparatus according to claim 8, further comprising means for setting one of the first and second modes when said print control apparatus is powered on.

10. The apparatus according to claim 1, further comprising print means for printing an image on a recording medium.

11. A print controlling method of controlling a print apparatus having a first input unit for inputting an instruction by a user, on the basis of an instruction sent from an information processing apparatus, comprising:

an operational-environment setting step of setting an operational environment in one of a first or second mode, wherein setting of the environment based on the instruction from the information processing apparatus and the first input unit is permitted in the first mode, and wherein setting of the environment based on the instruction from the information processing apparatus is permitted and setting of the environment based on the instruction from the first input unit is prohibited in the second mode; and a control step of terminating the setting of the operational environment based on the instruction from the first input unit in a case where it is instructed to switch the first mode to the second mode while the setting of the operational environment is performed based on the instruction from the first input unit in the first mode.

12. The method according to claim 11, further comprising a selection step of selecting one of the first and second modes based on the instruction from the information processing apparatus.

13. The method according to claim 11, further comprising a step of masking a signal from the first input unit in a case where the second mode is selected so that setting of the environment based on the signal is not performed at said operational-environment setting step.

14. The method according to claim 11, further comprising a step of inputting an instruction, by a user via a second input unit, to switch one of the first and second modes to the other mode.

15. The method according to claim 14, wherein the instruction inputted via the second input unit is effective in the second mode as well as in the first mode.

16. The method according to claim 14, wherein each of the first and second input unit has at least one key which is provided on a common operational panel.

17. The method according to claim 11, wherein the first input unit has a plurality of keys, and wherein selection of one of the first and second modes is instructed by a specific combination of the plurality of keys being manipulated by a user.

18. The method according to claim 11, further comprising a determination step of determining if the print apparatus can communicate with the information processing apparatus through a network, wherein said operational-environment setting stop sets the second mode in accordance with a positive determination result in said determination step.

19. The method according to claim 18, further comprising a step of setting one of the first and second modes when the print apparatus is powered on.

20. The method according to claim 11, further comprising a step of controlling a print operation in the print apparatus.

21. A print control apparatus for controlling a printing operation on the basis of an instruction sent from an information processing apparatus, comprising:

first input means for inputting an instruction by a user;

operational-environment setting means for setting an operational environment in one of first and second modes, wherein setting of the environment based on the instruction from said information processing apparatus and said first input means is permitted in the first mode, and wherein setting of the environment based on the instruction from said information processing apparatus is permitted and setting of the environment based on the instruction from said first input means is prohibited in the second mode; and determination means for determining if said print control apparatus can communicate with said information processing apparatus through a network, wherein said operational-environment setting means operates in the second mode in accordance with a determination result by said determination means.

22. The apparatus according to claim 21, further comprising selection means for selecting one of the first and second modes based on the instruction from said information processing apparatus.

23. The apparatus according to claim 21, further comprising means for masking a signal from said first input means in a case where the second mode is selected so that setting of the environment based on the signal is not performed by said operational-environment setting means.

24. The apparatus according to claim 21, further comprising second input means for inputting an instruction, by a user, to switch one of the first and second modes to the other mode.

25. The apparatus according to claim 24, wherein the instruction from said second input means is effective both in the first and second modes.

26. The apparatus according to claim 24, wherein each of said first and second input means has at least one key which is provided on a common operation panel.

27. The apparatus according to claim 21, wherein said first input means has a plurality of keys, and wherein selection of one of the first and second modes is instructed by a specific combination of the plurality of keys being manipulated by a user.

28. The apparatus according to claim 21, wherein said determination means includes detection means for detecting a status associated with connection between said print control apparatus and the network.

29. The apparatus according to claim 21, further comprising means for setting one of the first and second modes when said print control apparatus is powered on.

30. The apparatus according to claim 21, further comprising print means for printing an image on a recording medium.

31. A print controlling method of controlling a print apparatus having a first input unit for inputting an instruction by a user, on the basis of an instruction sent from an information processing apparatus, comprising:

an operational-environment setting step of setting an operational environment in one of a first and second modes, wherein setting of the environment based on the instruction from the information processing apparatus and the first input unit is permitted in the first mode, and wherein setting of the environment based on the instruction from the information processing apparatus is permitted and setting of the environment based on the instruction from the first input unit is prohibited in the second mode; and a determination step of determining if the print apparatus can communicate with the information processing apparatus through a network, wherein the operational-environment setting step operates in the second mode in accordance with a positive determination result in said determination step.

32. The method according to claim 31, further comprising a selection step of selecting one of the first and second modes based on the instruction from the information processing apparatus.

33. The method according to claim 31, further comprising a step of masking a signal from the first input unit in a case where the second mode is selected so that setting of the environment based on the signal is not performed at the operational-environment setting step.

34. The method according to claim 31, further comprising a step of inputting an instruction, by a user via a second input unit, to switch one of the first and second modes to the other mode.

35. The method according to claim 34, wherein the instruction from the second input unit is effective both in the first and second modes.

36. The method according to claim 34, wherein each of the first and second input unit has at least one key which is provided on a common operation panel.

37. The method according to claim 31, wherein the first input unit has a plurality of keys, and wherein selection of one of the first and second modes is instructed by a specific combination of the plurality of keys being manipulated by a user.

38. The method according to claim 31, wherein said determination step includes a detection step of detecting a status associated with connection between the print apparatus and the network.

39. The method according to claim 31, further comprising a step of setting one of the first and second modes when the print apparatus is powered on.

40. The method according to claim 31, further comprising a print step of printing an image on a recording medium.

* * * * *

UNITED STATES PATENT AND TRADEMARK OFFICE
CERTIFICATE OF CORRECTION

PATENT NO. : 6,038,376
DATED : March 14, 2000
INVENTOR(S): YASUTAKA NOGUCHI

It is certified that error appears in the above-identified patent and that said Letters Patent is hereby corrected as shown below:

SHEET 1:

FIG. 1, "OPERARTION" should read --OPERATION--.

SHEET 4:

FIG. 4, "OPERARTION" should read --OPERATION--.

SHEET 7:

FIG. 10, "OPERARTION" should read --OPERATION--.

COLUMN 6:

Line 3, "140" should read --140--.
    Line 42, "21," should read --21 denotes--.
    Line 43, "40," should read --40 denotes--.

UNITED STATES PATENT AND TRADEMARK OFFICE
CERTIFICATE OF CORRECTION

PATENT NO. : 6,038,376

DATED : March 14, 2000

INVENTOR(S): YASUTAKA NOGUCHI

It is certified that error appears in the above-identified patent and that said Letters Patent is hereby corrected as shown below:

COLUMN 15:

Line 43, "stop" should read --step--.

Signed and Sealed this

Tenth Day of April, 2001

*Attest:*

NICHOLAS P. GODICI

*Attesting Officer*   *Acting Director of the United States Patent and Trademark Office*